United States Patent
Oury et al.

(10) Patent No.: US 8,859,133 B2
(45) Date of Patent: *Oct. 14, 2014

(54) REPEATING FRAME BATTERY WITH COMPRESSION JOINING OF CELL TABS TO WELDED CONNECTION TERMINALS

(75) Inventors: Andrew P. Oury, Troy, MI (US); Daniel J. Casoli, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 644 days.

This patent is subject to a terminal disclaimer.

(21) Appl. No.: 12/857,904

(22) Filed: Aug. 17, 2010

(65) Prior Publication Data

US 2012/0045682 A1 Feb. 23, 2012

(51) Int. Cl.
| | | |
|---|---|---|
| *H01M 2/20* | (2006.01) | |
| *H01M 10/058* | (2010.01) | |
| *H01M 10/50* | (2006.01) | |
| *H01M 10/625* | (2014.01) | |
| *H01M 10/647* | (2014.01) | |
| *H01M 10/613* | (2014.01) | |
| *H01M 10/0525* | (2010.01) | |
| *H01M 10/0585* | (2010.01) | |
| *H01M 10/6555* | (2014.01) | |

(52) U.S. Cl.
CPC ...... *H01M 10/5055* (2013.01); *H01M 10/5016* (2013.01); *H01M 10/5032* (2013.01); *Y02E 60/122* (2013.01); *H01M 10/5004* (2013.01); *H01M 10/0525* (2013.01); *Y02T 10/7011* (2013.01); *H01M 10/0585* (2013.01)
USPC ............ 429/158; 429/120; 429/148; 429/160

(58) Field of Classification Search
CPC ... H01M 2/206; H01M 2/1077; H01M 2/305; H01M 10/5055; H01M 10/5004; H01M 10/0585; H01M 10/5016; H01M 10/5032; H01M 10/0525; Y02T 10/7011; Y02E 60/122
USPC .................. 429/96–100, 148, 158, 160, 120
See application file for complete search history.

(56) References Cited

U.S. PATENT DOCUMENTS

| | | | | |
|---|---|---|---|---|
| 5,553,675 | A * | 9/1996 | Pitzen et al. .................. | 173/217 |
| 2005/0123828 | A1* | 6/2005 | Oogami et al. ............... | 429/152 |

FOREIGN PATENT DOCUMENTS

CN 1619858 A 5/2005

* cited by examiner

*Primary Examiner* — Raymond Alejandro
*Assistant Examiner* — Helen McDermott
(74) *Attorney, Agent, or Firm* — Fraser Clemens Martin & Miller LLC; J. Douglas Miller (57) ABSTRACT

A repeating frame assembly for a battery pack includes a first cooling frame member having a first electrically conductive connection terminal adjacent a first end of the first cooling frame member. The connection terminal includes a top leg forming at least a portion of the first surface of the first cooling frame member and a bottom leg forming at least a portion of the second surface of the first cooling frame member. A first electrically conductive tab of a first battery cell is attached to the top leg of the first electrically conductive connection terminal. A second battery cell may be contained within a second cooling frame member or a first spacer frame member having a second electrically conductive connection terminal adjacent a first end thereof for providing a compression joint having a low resistance electrical connection to the second tab of the first battery cell.

17 Claims, 2 Drawing Sheets

FIG. 1

REPEATING FRAME BATTERY WITH COMPRESSION JOINING OF CELL TABS TO WELDED CONNECTION TERMINALS

FIELD OF THE INVENTION

The present disclosure relates to a battery pack and more particularly to a battery pack assembly for housing battery cells.

BACKGROUND OF THE INVENTION

A battery cell has been proposed as a clean, efficient and environmentally responsible power source for an electric device such as an electric vehicle, for example. Typically, a plurality of individual battery cells is provided to supply an amount of electric power sufficient to operate the electric device. The plurality of individual battery cells must be physically supported and protected as well as be in electrical communication with each other and the electrical device. Further, it is often desired to provide cooling to the battery cells during a charging and a discharging thereof and venting of the battery cells.

A battery pack assembly is typically provided to support and protect the plurality of battery cells and facilitate placing individual battery cells in electrical communication with each other and with the associated electrical device. Additionally, the battery pack assembly often provides a cooling system to militate against undesirable overheating of the battery cells and a venting system. To provide such desired electrical communication, cooling, and venting, a complexity and cost of the battery pack assembly for use in a hybrid automobile is undesirably increased.

Additionally, it is desirable to mechanically and electrically connect adjacent individual battery cells with each other with a low electrical resistance connection, on the order of 30 micro-Ohms. It is also desirable to provide a voltage sense lead from each terminal of the individual battery so that electrical hardware can measure and adjust (via cell balancing) the voltage of each cell. Further, it is desirable that each battery cell inside the battery pack be provided with an isolated chamber or space that can capture and vent to a predetermined vent area any gases, liquids, or solids that the cell might expel. Still further, it is desirable to provide coolant flow paths or channels within the battery pack assembly through which gaseous or liquid coolant may flow to cool the battery cells, wherein the coolant flow paths are isolated from the isolated chamber, space or predetermined vent area. Lastly, it is desirable to provide all of the aforementioned features in a battery pack assembly that is easy to manufacture at a low cost.

SUMMARY OF THE INVENTION

Concordant and consistent with the present invention, a repeating frame battery pack assembly for housing a plurality of battery cells providing electrical connections between adjacent battery cells and between the battery pack assembly and an associated electrical device and cooling and venting of the plurality of battery cells, wherein an ease of manufacturing the battery pack assembly is maximized and a cost thereof is minimized, has surprisingly been discovered.

A repeating frame assembly for a battery pack having a plurality of battery cells includes a first cooling frame member having a first surface and a second surface and a first end and a second end, at least one of the first surface and the second surface adapted to transfer heat to a cooling fluid. A first electrically conductive connection terminal adjacent the first end of the first cooling frame member has a top leg electrically connected to a bottom leg, the top leg forming at least a portion of the first surface of the first cooling frame member and the bottom leg forming at least a portion of the second surface of the first cooling frame member. A first battery cell abuts at least a portion of the first surface and has a first electrically conductive tab in facing contact with the top leg of the first electrically conductive connection terminal and a second electrically conductive tab adjacent the second end of the first cooling frame member. The first electrically conductive tab of the first battery cell is connected to the top leg of the first electrically conductive connection terminal with one of resistance welding, laser welding, chemical welding, ultrasonic welding, brazing and soldering.

In one embodiment, the repeating frame assembly further includes a second cooling frame member having a first surface and a second surface and a first end and a second end, at least one of the first surface and the second surface adapted to transfer heat to a cooling fluid, the second surface abutting at least a portion of the first battery cell, and the first end of the second cooling frame member aligned adjacent the second end of the first cooling frame member. A second electrically conductive connection terminal adjacent the first end of the second cooling frame member has a top leg electrically connected to a bottom leg, the top leg of the second electrically conductive connection terminal forming at least a portion of the first surface of the second cooling frame member and the bottom leg of the second electrically conductive connection terminal forming at least a portion of the second surface of the second cooling frame member. A second battery cell abuts at least a portion of the first surface of the second cooling frame member and has a first electrically conductive tab in facing contact with the top leg of the second electrically conductive connection terminal and a second electrically conductive tab adjacent the second end of the second cooling frame member. The first electrically conductive tab of the second battery cell is connected to the top leg of the second electrically conductive connection terminal with one of resistance welding, laser welding, chemical welding, ultrasonic welding, brazing and soldering. The second electrically conductive tab of the first battery cell is electrically connected to the bottom leg of the second electrically conductive connection terminal by a compression joint.

In another embodiment, the second cooling frame member is replaced by a first spacer frame member to provide for one cooling member for each two battery cells.

In another embodiment, the second electrically conductive tab of the first battery cell and a bottom surface of the bottom leg of the second electrically conductive connection terminal are formed of and coated with materials that provide for a low resistance electrical contact when a compression joint is formed therebetween.

In another embodiment, a second spacer frame member is added to provide for one cooling member for each three battery cells.

In another embodiment, the connection terminals further include a voltage sensing lead in electrical communication therewith.

BRIEF DESCRIPTION OF THE DRAWINGS

The above, as well as other advantages of the present invention will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
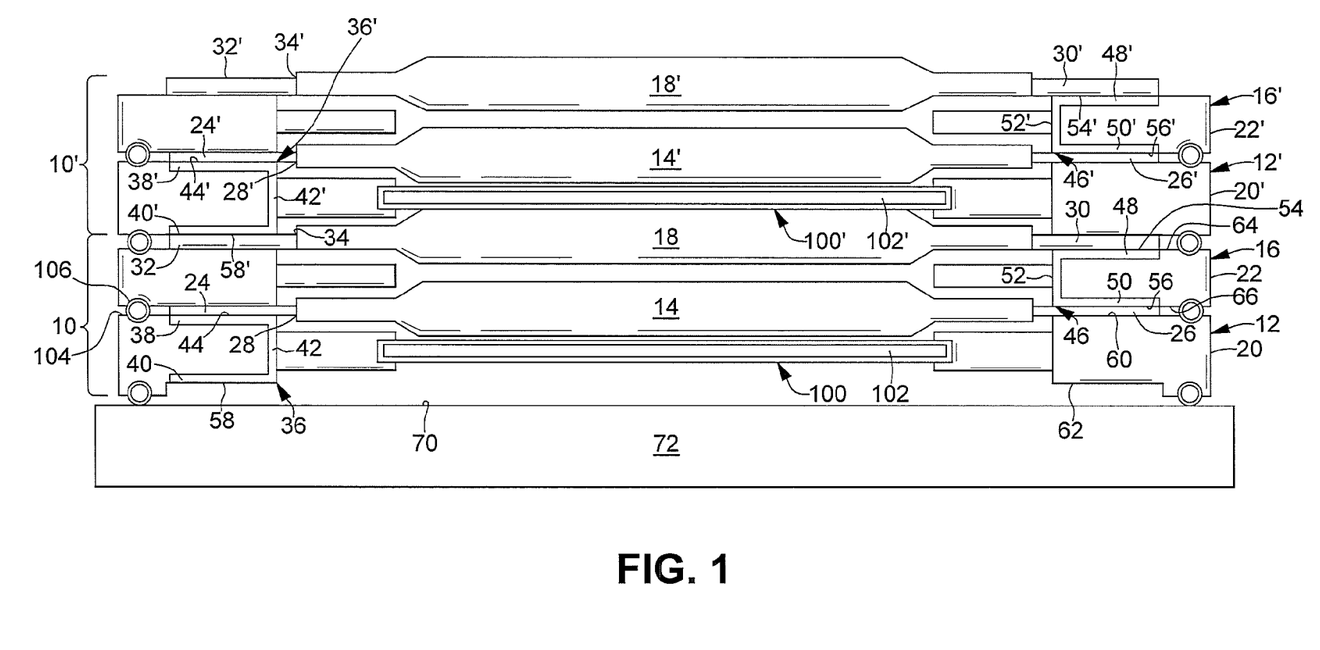
FIG. 1 is a side elevational view of a repeating frame assembly having one cooling frame member for two battery cells according to an embodiment of the present disclosure.

A repeating frame assembly 10 is shown in FIG. 1 to allow for electrical interconnection of a plurality of battery cells. A second repeating frame assembly 10' is also shown in FIG. 1 to illustrate the combination of the repeating frame assemblies 10, 10' to form a portion of a battery pack. Structure repeated from the description of the repeating frame assembly 10 includes the same reference numeral and a prime (') symbol with reference to the repeating frame assembly 10'.

The repeating frame assembly 10 is formed from a cooling frame member 12, a first battery cell 14, a spacer frame member 16, and a second battery cell 18. It is understood that the cooling frame member 12 and the spacer frame member 16 may have any cross-sectional shape as desired to accommodate a shape of a battery cell and a fitment with an associated electrical device. It is further understood that an outer perimeter 20 of the cooling frame member 12 aligns substantially with an outer perimeter 22 of the spacer frame member 16 to provide a clean assembly therebetween. The cooling frame member 12 and the spacer frame member 16 may be formed as unitary members by known methods from an electrically non-conductive material. As a non-limiting example, the cooling frame member 12 and the spacer frame member 16 may be formed by injection molding a material such as a nylon, polypropylene, metal, or other material having suitable physical and chemical properties. As a further non-limiting example, the cooling frame member 12 may be of the type described in commonly owned U.S. patent application Ser. No. 12/789,888, entitled "Corrugated Fin And Frame Assembly For Battery Cooling", incorporated herein by reference in its entirety. The cooling frame member 12 may include a cooling plate 100 arranged in facing contact with the first battery cell 14 to provide cooling and support thereto. The cooling plate 100 may further include an internal channel 102 to enable flow of a coolant (not shown) therethrough to provide active cooling of the first battery cell 14.

In the illustrated embodiment, the first battery cell 14 and the second battery cell 18 are prismatic lithium-ion battery cells. However, it is understood that any type of battery cell, employing a different structure and electrochemistry, may be utilized according to the present disclosure. The first battery cell 14 includes a first electrically conductive tab 24 and a second electrically conductive tab 26 extending outwardly from a perimeter 28 of the battery cell 14. The second battery cell 18 includes a first electrically conductive tab 30 and a second electrically conductive tab 32 extending outwardly from a perimeter 34 of the second battery cell 18. It is understood that the first and second electrically conductive tabs 24, 26 of the first battery cell 14 may extend outwardly from the first battery cell 14 in any desired location along the perimeter 28 of the first battery cell 24, and may be formed of any electrically conductive material and in any desired shape to facilitate establishing electrical communication with the adjacent battery cell 18 (and with the cooling frame member 12) and the spacer frame member 16. Similarly, it is understood that the first and second electrically conductive tabs 30, 32 of the second battery cell 18 may extend outwardly from the second battery cell 18 in any desired location along the perimeter 34 of the second battery cell 18, and may be formed of any electrically conductive material and in any desired shape to facilitate establishing electrical communication with the adjacent battery cell 14' and with the spacer frame member 16 (and the cooling frame member 12'). It is understood that the first electrically conductive tab and the second electrically conductive tab of each battery cell may further be formed of the same or similar conductive materials, as desired.

When a plurality of battery cells is arranged in a series connected configuration, a second electrically conductive tab of a first battery cell is intended to be electrically interconnected with a first electrically conductive tab of a second battery cell. To provide the required electrical interconnections between adjacent battery cells 14, 18 within the repeating frame assembly 10, the cooling frame member 12 includes a first electrically conductive connection terminal 36. The first electrically conductive connection terminal 36 is depicted in the figures as having a substantially U-shaped cross-section having a top leg 38, a bottom leg 40, and a base leg 42 electrically interconnecting the top leg 38 and the bottom leg 40. Favorable results have been achieved when the first electrically conductive connection terminal 36 is molded into the cooling frame member 12 at a predetermined location where the top leg 38 forms a portion of a top surface 60 of the cooling frame member 12, and where the bottom leg 40 forms a portion of a bottom surface 62 of the cooling frame member 12. Additionally, the first electrically conductive connection terminal 36 is located to allow the first electrically conductive tab 24 of the first battery cell 14 to be placed adjacent and in facing contact with an outer surface 44 of the top leg 38 of the first electrically conductive connection terminal 36. The first battery cell 14 may be electrically and mechanically connected to the top leg 38 of the first electrically conductive connection terminal 36 by one of resistance welding, laser welding, chemical welding, ultrasonic welding, brazing and soldering to retain the first battery cell 14 in position relative to the cooling frame member 12 prior to and during assembly of the cooling frame member 12 to an adjacent spacer frame member 16, and to provide a low electrical resistance joint, on the order of 30 micro-Ohms.

The spacer frame member 16 includes a second electrically conductive connection terminal 46, depicted in the figures as having a substantially U-shaped cross-section having a top leg 48, a bottom leg 50, and a base leg 52 electrically interconnecting the top leg 48 and the bottom leg 50. Favorable results have been achieved when the second connection terminal 46 is molded into the spacer frame member 16 at a predetermined location where the top leg 48 forms a portion of a top surface 64 of the spacer frame member 16, and where the bottom leg 50 forms a portion of a bottom surface 66 of the spacer frame member 16. The second connection terminal 46 is located to allow the first electrically conductive tab 30 of the second battery cell 18 to be placed adjacent and in facing contact with an outer surface 54 of the top leg 48 of the second connection terminal 46. The second connection terminal 46 is further located to allow the second electrically conductive tab 26 of the first battery cell 14 to be placed adjacent and in facing contact with an outer surface 56 of the bottom leg 50 of the second connection terminal 46, thereby electrically interconnecting the first battery cell 14 with the second battery cell 18. The second battery cell 18 may be electrically and mechanically connected to the top leg 48 of the second connection terminal 46 by one of resistance welding, laser welding, chemical welding, ultrasonic welding, brazing and soldering to retain the second battery cell 18 in position relative to the spacer frame member 16 prior to and during assembly of the spacer frame member 16 to an adjacent cooling frame member 12'. The cooling frame member 12, including the first battery cell 14, is assembled to the spacer frame member 16, including the second battery cell 18, to stack the second battery cell 18 onto at least a portion of the first battery cell 14 to form the repeating frame assembly 10. The first battery cell is supported and cooled by the cooling plate 100. Once compressed (not shown) into contact with the first battery cell 14, the second battery cell 18 is also supported by the cooling plate 100, and a portion of heat generated within the second battery cell 18 may be conducted through the first battery cell 14 to the cooling plate 100. Thus, two battery cells, for example battery cells 14, 18, are provided for each cooling plate, for example cooling plate 100, in the embodiment shown in FIG. 1. Additionally, because the first electrically conductive connection terminal 36 is molded directly into the cooling frame member 12, and because the second electrically conductive connection terminal 46 is molded directly into the spacer frame member 16, an ease of stacking a spacer frame member 16 onto a cooling frame member 12 while providing a low resistance electrical connection between adjacent battery cells is maximized. The cross-sectional shape of each cooling frame member 12 and each spacer frame member 16 may be chosen to allow an interface 104 between adjacent frame members to be substantially planar, enabling installation of a perimeter seal 106 within the interface 104 to allow sealing of the battery cells within an enclosed space.

One or more cooling frame members 12' may be combined with an equal number of spacer frame members 16' to form one or more repeating frame assemblies 10' that may be sequentially stacked and assembled with the repeating frame assembly 10 to form a battery pack. As shown in FIG. 1, when a repeating frame assembly 10' is stacked onto the repeating assembly 10, the first electrically conductive connection terminal 36' of the cooling frame member 12' is located to allow the second electrically conductive tab 26 of the first battery cell 14 to be placed adjacent and in facing contact with an outer surface 56 of the bottom leg 50 of the second connection terminal 46, thereby electrically interconnecting the first battery cell 14 with the second battery cell 18. Alternating the cooling frame members 12, 12' and the spacer frame members 16, 16' allows for an easy series interconnection of a plurality of the battery cells 14, 18, 14', 18' while providing a desired amount of support and cooling to the battery cells 14, 18, 14', 18'.

In one embodiment, the first electrically conductive tab 24 of the first battery cell 14 and the first electrically conductive tab 30 of the second battery cell 18 are formed of an aluminum material, or an aluminum clad material. As shown, the first electrically conductive tabs 24, 30 extend or are bent substantially parallel to a plane defined by an interior surface 70 of a base plate 72 that forms one end of the battery pack assembly of FIG. 1. Similarly, the second electrically conductive tab 26 of the first battery cell 14 and the second electrically conductive tab 32 of the second battery cell 18 are formed of a copper material, a copper clad material, a coated copper material, or a copper alloy, and extend or are bent substantially parallel to a plane defined by the interior surface 70 of the base plate 72. The first electrically conductive tabs 24, 30 of the respective first battery cell 14 and the second battery cell 18 are electrically and mechanically connected to the respective top legs 38, 48 of the first electrically conductive connection terminal 36 and the second connection terminal 46 by one of resistance welding, laser welding, chemical welding, ultrasonic welding, brazing and soldering. The mechanical and electrical connection retains the first battery cell 14 in position relative to the cooling frame member 12, and likewise retains the second battery cell 18 in position relative to the spacer frame member 16 prior to and during assembly of the spacer frame member 16 to the cooling frame member 12, and provides a low resistance electrical connection, on the order of 30 micro-Ohms.

In another embodiment, the second electrically conductive tab 26 of the first battery cell 14 and the outer surface 56 of the bottom leg 50 of the second connection terminal 46 may both be formed of and coated with materials that provide for a low resistance electrical contact therebetween when a compression joint is formed between the second electrically conductive tab 26 of the first battery cell 14 and the bottom leg 50 of the second connection terminal 46 when the spacer frame member 16 is assembled to the cooling frame member 12. As a non-limiting example, if the second electrically conductive tab 26 of the first battery cell 14 is formed of nickel coated copper, and the bottom leg 50 of the second connection terminal is formed of sulfamate nickel coated aluminum, or sulfamate nickel coated aluminum clad material, a low resistance compression joint, on the order of 30 micro-Ohms, may be achieved therebetween during assembly and compression of the battery pack. The compression joint minimizes the difficulty of both assembly and disassembly of the battery pack because no welding is required to form the low-resistance electrical connection.

Similarly, when a repeating frame member 10 is assembled to a repeating frame member 10', the second electrically conductive tab 32 of the second battery cell 18 and the outer surface 58' of the bottom leg 40' of the first electrically conductive connection terminal 36' of the cooling frame member 12' may both be formed of a material that provides for a low resistance electrical contact therebetween when a compression joint is formed between the second electrically conductive tab 32 of the second battery cell 18 and the bottom leg 40' of the first electrically conductive connection terminal 36'. For example, the outer surface 58' of the bottom leg 40' of the first electrically conductive connection terminal 36' is formed of a sulfamate nickel coated aluminum, or a sulfamate nickel coated aluminum clad material, and the second electrically conductive tab 32 of the second battery 18 may be formed of nickel coated copper material, a nickel coated copper clad material, or a nickel coated copper alloy. The compression joint minimizes the difficulty of both assembly and disassembly of the battery pack because no welding is required to form the low-resistance electrical connection.

In another embodiment, the first electrically conductive connection terminal 36 and the second electrically conductive connection terminal 46 are formed of a sulfamate nickel coated aluminum, or a sulfamate nickel coated aluminum clad material. The first electrically conductive tabs 24, 30 of the respective first battery cell 14 and the second battery cell 18 are electrically and mechanically connected to the respective top legs 38, 48 of the first electrically conductive connection terminal 36 and the second connection terminal 46 by one of resistance welding, laser welding, chemical welding, ultrasonic welding, brazing and soldering. The mechanical connection is not affected by the sulfamate nickel coating, and the mechanical connection also provides a low resistance electrical connection, on the order of 30 micro-Ohms. The second electrically conductive tab 26 of the first battery cell 14 may be formed of and coated with a material that provides for a low resistance electrical contact when a compression joint is formed between the second electrically conductive tab 26 of the first battery cell 14 and the coated second connection terminal 46 when the spacer frame member 16 is assembled to the cooling frame member 12. As a non-limiting example, if the second electrically conductive tab 26 of the first battery cell 14 is formed of nickel coated copper, and the second connection terminal 46 is formed of sulfamate nickel coated aluminum, or sulfamate nickel coated aluminum clad material, a low resistance compression joint, on the order of 30 micro-Ohms, may be achieved therebetween during assembly and compression of the battery pack. The compression joint minimizes the difficulty of both assembly and disassembly of the battery pack because no welding is required to form the low-resistance electrical connection.

Figure 2:
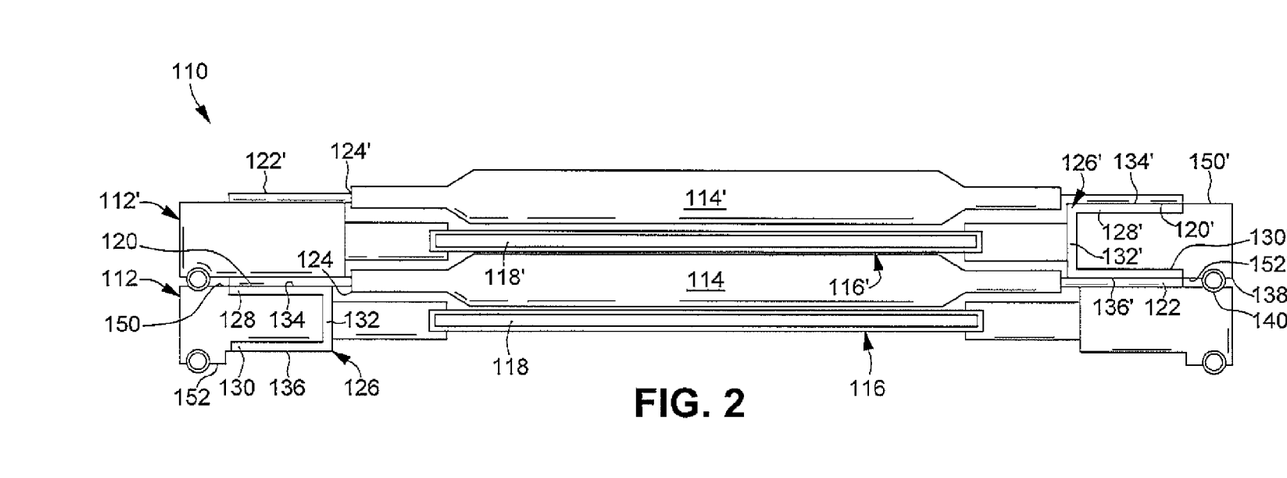
FIG. 2 is a side elevational view of a repeating frame assembly having one cooling frame member for each battery cell according to another embodiment of the present disclosure.

A repeating frame assembly 110 is shown in FIG. 2 that provides cooling to each individual battery cell. The repeating frame assembly 110 includes a first cooling frame member 112 and a second cooling frame member 112'. Favorable results have been obtained where the first cooling frame member 112 and the second cooling frame member 112' are substantially identical, and are oriented relative to each other to make appropriate electrical connections between a first battery cell 114 and a second battery cell 114'.

However, it is understood that the first cooling frame member 112 need not be substantially identical to the second cooling frame member 112', as desired. The cooling frame members 112, 112' may be formed as unitary members by known methods from an electrically non-conductive material. As a non-limiting example, the cooling frame members 112, 112' may be formed by injection molding a material such as a nylon, polypropylene, metal, or other material having suitable physical and chemical properties. As a further non-limiting example, the cooling frame members 112, 112' may be of the type described in commonly owned U.S. patent application Ser. No. 12/789,888, entitled "Corrugated Fin And Frame Assembly For Battery Cooling", incorporated herein by reference in its entirety. The cooling frame members 112, 112' may include respective cooling plates 116, 116' arranged in facing contact with the respective battery cells 114, 114' to provide cooling and support thereto. The cooling plates 116, 116' may further include internal channels 118, 118' to enable flow of a coolant (not shown) therethrough to provide active cooling of the respective battery cells 114, 114'.

The first battery cell 114 includes a first electrically conductive tab 120 and a second electrically conductive tab 122 extending from a perimeter 124. The second battery cell 114' includes a first electrically conductive tab 120' and a second electrically conductive tab 122' extending from a perimeter 124'. In the illustrated embodiment, the battery cells 114, 114' are substantially identical prismatic lithium-ion battery cells. However, it is understood that any type of battery cell, employing a different structure and electrochemistry, may be utilized according to the present disclosure. It is also understood that the first electrically conductive tabs 120, 120' and the second electrically conductive tabs 122, 122' of the respective battery cells 114, 114' may extend outwardly from any desired location along the perimeters 124, 124' of the battery cells 114, 114', and may be formed of any electrically conductive material and in any desired shape to facilitate establishing electrical communication with an adjacent battery cell and with the cooling frame members 112, 112'. It is understood that the first electrically conductive tabs 120, 120' and the second electrically conductive tabs 122, 122' may further be formed of the same or similar conductive materials, as desired.

When the battery cells 114, 114' are arranged in a series connected configuration, the second electrically conductive tab 122 of the first battery cell 114 is intended to be electrically interconnected with the first electrically conductive tab 120' of the second battery cell 114'. To provide the required electrical interconnections between adjacent batteries 114, 114', the cooling frame member 112 includes a first electrically conductive connection terminal 126. The first electrically conductive connection terminal 126 is depicted in the figures as having a substantially U-shaped cross-section having a top leg 128, a bottom leg 130, and a base leg 132 electrically interconnecting the top leg 128 and the bottom leg 130. Favorable results have been achieved when the first electrically conductive connection terminal 126 is molded into the cooling frame member 112 at a predetermined location where the top leg 128 forms a portion of a top surface 150 of the cooling frame member 112, and where the bottom leg 130 forms a portion of a bottom surface 152 of the cooling frame member 112. Additionally, the first electrically conductive connection terminal 126 is located to allow the first electrically conductive tab 120 of the first battery cell 114 to be placed adjacent and in facing contact with an outer surface 134 of the top leg 128 of the first electrically conductive connection terminal 126. The first electrically conductive tab 120 of the battery cell 114 may be electrically and mechanically connected to the top leg 128 of the connection terminal 126 by one of resistance welding, laser welding, chemical welding, ultrasonic welding, brazing and soldering to retain the first battery cell 114 in position relative to the cooling frame member 112 prior to and during assembly of the cooling frame member 112 to the adjacent cooling frame member 112', and to provide low electrical resistance joints, on the order of 30 micro-Ohms.

Similarly, the cooling frame member 112' includes a second electrically conductive connection terminal 126'. The second electrically conductive connection terminal 126' is depicted in the figures as having a substantially U-shaped cross-section having a top leg 128', a bottom leg 130', and a base leg 132' electrically interconnecting the top leg 128' and the bottom leg 130'. Favorable results have been achieved when the second connection terminal 126' is molded into the cooling frame member 112' at a predetermined location where the top leg 128' forms a portion of a top surface 150' of the cooling frame member 112', and where the bottom leg 130' forms a portion of a bottom surface 152' of the cooling frame member 112'. Additionally, the second connection terminal 126' is located to allow the first electrically conductive tab 120' of the second battery cell 114' to be placed adjacent and in facing contact with an outer surface 134' of the top leg 128' of the second connection terminal 126'. The first electrically conductive tab 120' of the battery cell 114' may be electrically and mechanically connected to the top leg 128' of the second connection terminal 126' by one of resistance welding, laser welding, chemical welding, ultrasonic welding, brazing and soldering to retain the second battery cell 114' in position relative to the cooling frame member 112' prior to and during attachment of an adjacent repeating frame member 110 to the cooling frame member 112', and to provide low electrical resistance joints, on the order of 30 micro-Ohms.

Once assembled individually, the two cooling frame members 112, 112', including the batteries 114, 114', are sequentially stacked and assembled to form the repeating frame assembly 110. The cross-sectional shape of each cooling frame member 112, 112' may be chosen to allow an interface 138 between adjacent frame members to be substantially planar, enabling installation of a perimeter seal 140 within the interface 138 to allow sealing of the battery cells within an enclosed space.

As shown in FIG. 2, when the cooling frame member 112' is stacked onto the cooling frame member 112, the connection terminal 126' of the cooling frame member 112' is located to allow the second electrically conductive tab 122 of the first battery cell 114 to be placed adjacent and in facing contact with an outer surface 136' of the bottom leg 130' of the connection terminal 126'. Favorable results have been obtained where the second electrically conductive tabs 122, 122' of the battery cells 114, 114' and the outer surfaces 136, 136' of the bottom legs 130, 130' of the connection terminals 126, 126' are formed of and coated with materials that provide for a low resistance electrical contact when a compression joint is formed therebetween. As a non-limiting example, if the second electrically conductive tab 122, 122' of the respective battery cells 114, 114' is formed of nickel coated copper, and the outer surfaces 136, 136' of the bottom legs 130, 130' of the connection terminals 126, 126' are formed of sulfamate nickel coated aluminum, or sulfamate nickel coated aluminum clad material, a low resistance compression joint on the order of 30 micro-Ohms may be achieved therebetween during assembly and compression of the battery pack. The compression joint electrically interconnects the first battery cell 114 with the second battery cell 114', and minimizes the difficulty of both assembly and disassembly of the battery pack because no welding is required to form the low-resistance electrical connection.

To build a battery pack, a plurality of repeating frame assemblies 110 may be sequentially stacked and assembled so that the second electrically conductive tab 122' of the second battery 114' is placed adjacent and in facing contact with an outer surface 136 of the bottom leg 130 of the connection terminal 126 of an adjacent cooling frame member 112 to achieve a low resistance compression joint therebetween and to electrically interconnect the plurality of repeating frame assemblies 110. Stacking a plurality of repeating frame assemblies 110 facilitates easy series interconnection of a plurality of battery cells 114, 114' while providing support and cooling to each individual battery cell.

Figure 3:
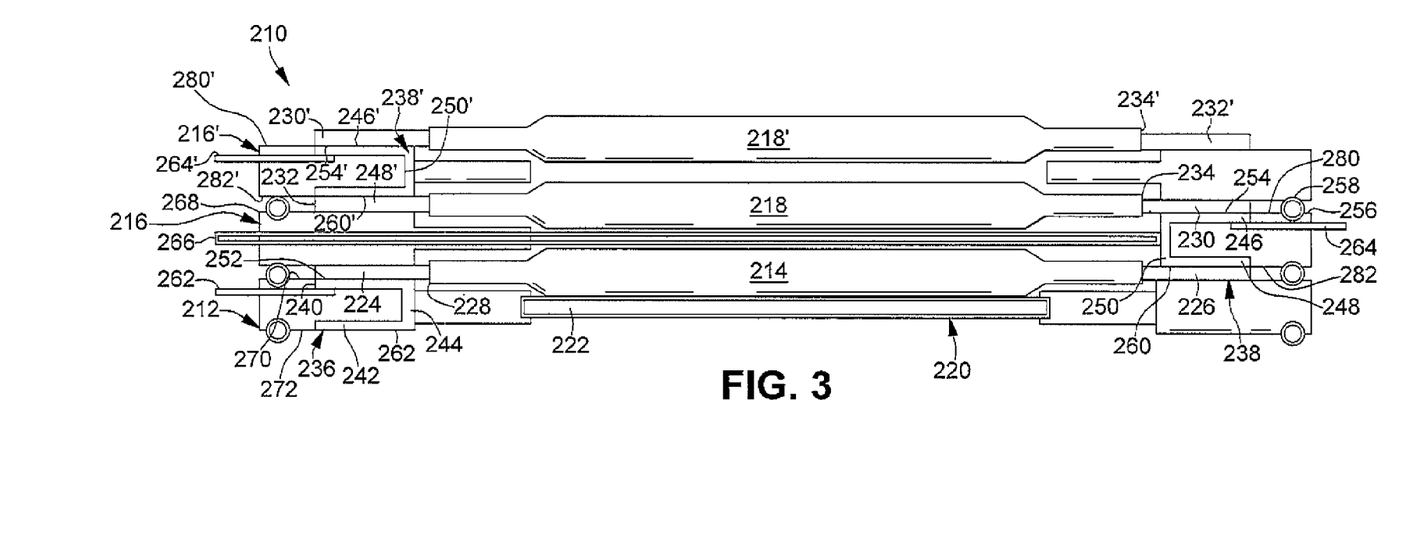
FIG. 3 is a side elevational view of a repeating frame assembly having one cooling frame member for three battery cells according to an embodiment of the present disclosure, further including voltage sensing leads electrically connected to the connection terminals.

For lower power density applications, it may be desirable to construct a battery pack from a predetermined number of repeating frame assemblies, each having one cooling frame for a plurality of battery cells. Such a repeating frame assembly 210 is shown in FIG. 3 that provides one cooling frame member 212 including a first battery cell 214, a first spacer frame member 216 including a second battery cell 218, and a second spacer frame member 216' including a third battery cell 218'. Thus, one cooling frame member 212 is provided for three battery cells 214, 218, 218'. The second spacer frame member 216' is substantially identical to the first spacer frame member 216. Accordingly, structure repeated from the description of the first spacer frame member 216 includes the same reference numeral and a prime (') symbol. The cooling frame member 212, the first spacer frame member 216, and the second spacer frame member 216' are oriented relative to each other to make appropriate electrical connections between the first battery cell 214, the second battery cell 218, and the third battery cell 218'.

The cooling frame member 212 may be formed as a unitary member by known methods from an electrically non-conductive material. As a non-limiting example, the cooling frame member 212 may be formed by injection molding a material such as a nylon, polypropylene, metal, or other material having suitable physical and chemical properties. As a further non-limiting example, the cooling frame member 212 may be substantially similar to the cooling frames 12, 112 described hereinabove, and may be of the type described in commonly owned U.S. patent application Ser. No. 12/789,888, entitled "Corrugated Fin And Frame Assembly For Battery Cooling", incorporated herein by reference in its entirety. The cooling frame member 212 may include a cooling plate 220 arranged in facing contact with the first battery cell 214 to provide cooling and support thereto. The cooling plates 220 may further include an internal channel 222 to enable flow of a coolant (not shown) therethrough to provide active cooling of the battery cells 214, 218, 218'.

The first battery cell 214 includes a first electrically conductive tab 224 and a second electrically conductive tab 226 extending from a perimeter 228 of the first battery cell 214. Similarly, the second and third battery cells 218, 218' include respective first electrically conductive tabs 230, 230' and second electrically conductive tabs 232, 232' extending from respective perimeters 234, 234' thereof. In the illustrated embodiment, the battery cells 214, 218, 218' are substantially identical prismatic lithium-ion battery cells. However, it is understood that any type of battery cell, employing a different structure and electrochemistry, may be utilized according to the present disclosure. It is also understood that the first electrically conductive tabs 224, 230, 230' and the second electrically conductive tabs 226, 232, 232' of the respective battery cells 214, 218, 218' may extend outwardly from any desired location along the perimeters 228, 234, 234' of the battery cells 214, 218, 218', and may be formed of any electrically conductive material and in any desired shape to facilitate establishing electrical communication with adjacent battery cells. It is understood that the first electrically conductive tabs 224, 230, 230' and the second electrically conductive tabs 226, 232, 232' may further be formed of the same or similar conductive materials, as desired.

To provide the required electrical interconnections between the first battery 214, the second battery 218, and the third battery 218', the cooling frame member 212 includes a first electrically conductive connection terminal 236, the first spacer frame member 216 includes a second electrically conductive connection terminal 238, and the second spacer frame member 216' includes a third electrically conductive connection terminal 238'. The electrically conductive connection terminals 236, 238, 238' are depicted in FIG. 3 as having substantially U-shaped cross-sections. The first electrically conductive connection terminal 236 has a top leg 240, a bottom leg 242, and a base leg 244 electrically interconnecting the top leg 240 and the bottom leg 242. Favorable results have been achieved when the first electrically conductive connection terminal 236 is molded into the cooling frame member 212 at a predetermined locations where the top leg 240 forms a portion of a top surface 270 of the cooling frame member 212 and where the bottom leg 242 forms a portion of a bottom surface 272 of the cooling frame member 212.

The second electrically conductive connection terminal 238 of the first spacer frame member 216 has a top leg 246, a bottom leg 248, and a base leg 250 electrically interconnecting the top leg 246 and the bottom leg 248 of the second electrically conductive connection terminal 238. Favorable results have been achieved when the second electrically conductive connection terminal 238 is molded into the first spacer frame member 216 at predetermined locations where the top leg 246 forms a portion of a top surface 280 of the first spacer frame member 216 and where the bottom leg 248 forms a portion of a bottom surface 282 of the first spacer frame member 216.

The third electrically conductive connection terminal 238' of the second spacer frame member 216' has a top leg 246', a bottom leg 248', and a base leg 250' electrically interconnecting the top leg 246' and the bottom leg 248' of the third electrically conductive connection terminal 238'. Favorable results have been achieved when the connection terminal 238' is molded into the second spacer frame member 216' at predetermined locations where the top leg 246' forms a portion of a top surface 280' of the second spacer frame member 216' and where the bottom leg 248' forms a portion of a bottom surface 282' of the second spacer frame member 216'.

The first electrically conductive connection terminal 236 is located to allow the first electrically conductive tab 224 of the first battery cell 214 to be placed adjacent and in facing contact with an outer surface 252 of the top leg 240 of the first electrically conductive connection terminal 236. The first battery cell 214 may be electrically and mechanically connected to the top leg 240 of the first electrically conductive connection terminal 236 by one of resistance welding, laser welding, chemical welding, ultrasonic welding, brazing and soldering to retain the first battery cell 214 in position relative to the cooling frame member 212 prior to and during assembly of the cooling frame member 212 to the adjacent first spacer frame member 216.

The second battery cell 218 may be electrically and mechanically connected to an outer surface 254 of the top leg 246 of the second connection terminal 238 by one of resistance welding, laser welding, chemical welding, ultrasonic welding, brazing and soldering to retain the second battery cell 218 in position relative to the first spacer frame member 216 prior to and during assembly of the first spacer frame member 216 to the adjacent cooling frame member 212 and to the second spacer frame member 216', or to another repeating frame assembly 210, and to provide low electrical resistance joints, on the order of 30 micro-Ohms.

Once assembled individually, the cooling frame member 212 and the first battery cell 214, the first spacer frame member 216 and the second battery cell 218, and the second spacer frame member 216' and the third battery cell 218' are sequentially stacked and assembled to form the repeating frame assembly 210. The cross-sectional shapes of the cooling frame member 212, the first spacer frame member 216, and the second spacer frame member 216' may be chosen to allow an interface 256 between adjacent frame members to be substantially planar, enabling installation of a perimeter seal 258 within each interface 256 to allow sealing of the battery cells 214, 218, 218' within an enclosed space.

The first spacer frame member 216 is stacked onto the cooling frame member 212 to locate the second connection terminal 238, of the first spacer frame member 216 to allow the second electrically conductive tab 226 of the first battery cell 214 to be placed adjacent and in facing contact with an outer surface 260 of the bottom leg 248 of the second connection terminal 238. Favorable results have been obtained where the second electrically conductive tab 226 of the first battery cell 214 and the outer surface 260 of the bottom leg 248 of the second connection terminal 238 are formed of and coated with materials that provide for a low resistance electrical contact when a compression joint is formed therebetween. As a non-limiting example, if both the second electrically conductive tab 226 of the first battery cell 214 and the outer surface 260 of the bottom leg 248 of the second connection terminal 238 are formed of copper material, a copper clad material, a copper plated material or a copper alloy, a low resistance compression joint, on the order of 30 micro-Ohms, may be achieved therebetween during assembly and compression of the battery pack. The compression joint electrically interconnects the first battery cell 214 with the second battery cell 218, and minimizes the difficulty of both assembly and disassembly of the battery pack because no welding is required to form the low-resistance electrical connection.

The second spacer frame member 216' is stacked onto the first spacer frame member 216 to locate the third connection terminal 238' of the second spacer frame member 216' to allow the second electrically conductive tab 232 of the second battery cell 218 to be placed adjacent and in facing contact with an outer surface 260' of the bottom leg 248' of the third connection terminal 238'. Favorable results have been obtained where the second electrically conductive tab 232 of the second battery cell 218 and the outer surface 260' of the bottom leg 248' of the third connection terminal 238' are formed of and coated with materials that provide for a low resistance electrical contact when a compression joint is formed therebetween.

To build a battery pack, a plurality of repeating frame assemblies 210 may be sequentially stacked and assembled so that the second electrically conductive tab 232' of the third battery 218' is placed adjacent and in facing contact with an outer surface 262 of the bottom leg 242 of the first electrically conductive connection terminal 236 of an adjacent cooling frame member 212 to achieve a low resistance compression joint therebetween and to electrically interconnect the plurality of repeating frame assemblies 210. Stacking a plurality of repeating frame assemblies 210 facilitates easy series interconnection of a plurality of battery cells 214, 218, 218' while providing support and cooling to three battery cells with a single cooling frame member. It is understood that more spacer frame members 216, 216' may be utilized so long as the cooling capacity of the cooling frame member 212 is sufficient to cool the resulting number of battery cells. Additionally, depending upon the geometry of each repeating frame assembly, it is understood that successive repeating frame assemblies 210 may require rotation relative to an adjacent repeating frame assembly to ensure an electrical interconnection between adjacent repeating frame assemblies. It is also understood that when the desired number of repeating frame assemblies 210 have been stacked, an external electrical circuit may be completed by connections made to appropriate connection terminals to allow power from the battery cells 214, 218, 218' to drive an electrical load. Tension rods (not shown) may be inserted through the plurality of repeating frame assemblies 210 to hold the resultant battery pack assembly under compression to form the compression joints. It is understood that tension straps or other compression force means may be used to compress the repeating frame assemblies 210.

Optionally, it may be desirable to selectively monitor the voltage of the individual battery cells. A first voltage sensing lead 262 is in electrical communication with the first electrically conductive connection terminal 236 and extends beyond the perimeter of the cooling frame member 212. Similarly, a second voltage sensing lead 264 is in electrical communication with the second connection terminal 238 and extends beyond the perimeter of the first spacer frame member 216, while a third voltage sensing lead 264' is in electrical communication with the third connection terminal 238' and extends beyond the perimeter of the second spacer frame member 216'. The voltage sensing leads 262, 264, 264' are shown in FIG. 3 as male pin style leads, but it is understood that the voltage sensing leads 262, 264, 264' may facilitate any type of electrical connection as desired. The voltage sensing leads 262, 264, 264' may also be integrally formed with the respective connection terminals 236, 238, 238', and may be selectively monitored by electrical hardware to measure and adjust (via cell balancing) the voltage of each cell. Optionally, a current limiting device (not shown) such as a fuse or similar device may be electrically interposed between each of the connection terminals 236, 238, 238' and the respective voltage sensing leads 262, 264, 264' to protect voltage sensing equipment or circuitry (not shown) from current surges. If desired, the voltage sensing leads 262, 264, 264' may be embedded or over molded to provide protection thereto.

The voltage sensing leads may be located on the same side of the repeating frame assembly 210 by replacing the voltage sensing lead 264 with an extended voltage sensing lead 266. The extended voltage sensing lead 266 is in electrical communication with the second electrically conductive connection terminal 238 and extends from the second electrically conductive connection terminal 238 to an opposite end 268 of the first spacer frame member 216. The extended voltage sensing lead 266 may be integrally formed with the second connection terminal 238, and may be embedded or over molded within the perimeter of the first spacer frame member 216.

Any number of repeating frame assemblies 10, 110, 210 may be combined to form a battery pack having a desired size and power density. It is understood that a battery pack may be assembled from a plurality of only one type of repeating frame member, or may be assembled from any combination of frame assemblies 10, 110, 210, as desired.

The repeating frame assemblies 10; 110, 210 of the present disclosure therefore provide an easy to manufacture assembly that both supports each individual battery and provides flexibility for selecting an appropriate and desired amount of cooling for each battery cell. For example, the repeating frame assembly 10 of FIG. 1 provides one cooling frame member 12 for each pair of batteries 14, 18. The repeating frame assembly 110 of FIG. 2 provides one cooling frame member 112 for each one battery 114. And the repeating frame assembly 210 of FIG. 3 provides one cooling frame member 212 for three batteries 214, 218, 218'.

Further, each repeating frame assembly 10, 110, 210 is easily disassembled and reconfigured as desired, because only one of the electrically conductive tabs of each battery is affixed in place by one of resistance welding, laser welding, chemical welding, ultrasonic welding, brazing and soldering to retain the battery cell in position relative to the frame member prior to and during assembly of the frame member to an adjacent frame member. In FIG. 1, for example, the first electrically conductive tab 24 of the first battery cell 14 is affixed to the first electrically conductive connection terminal 36 of the cooling frame member 12, while the second electrically conductive tab 26 of the first battery cell 14 is electrically connected to the second connection terminal 46 of the first spacer frame member 16 with a compression joint. The cooling frame member 12, including the first battery 14, may be easily separated from the first spacer frame member 16, including the second battery 18, to repair, replace, or reconfigure the repeating frame assembly 10.

While certain representative embodiments and details have been shown for purposes of illustrating the invention, it will be apparent to those skilled in the art that various changes may be made without departing from the scope of the disclosure, which is further described in the following appended claims.

What is claimed is:

1. A repeating frame assembly for a battery pack having a plurality of battery cells, the repeating frame assembly comprising:
a first cooling frame member having a first surface, a second surface, a first end, and a second end, at least one of the first surface and the second surface configured to transfer heat to a cooling fluid,
a first electrically conductive connection terminal having a substantially U-shaped cross section when viewed in a direction substantially parallel to the first surface of the first cooling frame member, the first electrically conductive connection terminal including a first leg and a second leg interconnected by a base leg, the first leg adjacent the first end of the first cooling frame member and forming a portion of the first surface thereof, the base leg substantially perpendicular to the first surface; and
a first battery cell abutting at least a portion of the first surface of the first cooling frame member and having a first electrically conductive tab formed of a first material in electrical communication with the first leg of the first electrically conductive connection terminal and a second electrically conductive tab formed of a second material different from the first material adjacent the second end of the first cooling frame member, the first electrically conductive tab of the first battery cell mechanically and electrically connected to the first leg of the first electrically conductive connection terminal with one of resistance welding, laser welding, chemical welding, ultrasonic welding, brazing and soldering to retain the first battery cell in position relative to the first cooling frame member prior to and during attachment to an adjacent frame member;
a second cooling frame member having a first surface and a second surface and a first end and a second end, at least one of the first surface and the second surface adapted to transfer heat to a cooling fluid, the second surface abutting at least a portion of the first battery cell, the first end of the second cooling frame member disposed adjacent the second end of the first cooling frame member;
a second electrically conductive connection terminal having a substantially U-shaped cross-section when viewed in a direction substantially parallel to the first surface of the second cooling frame member, the second electrically conductive connection terminal including a first leg and a second leg interconnected by a base leg, the first leg of the second electrically conductive connection terminal adjacent the first end of the second cooling frame member and forming a portion of the first surface thereof, the second leg of the second electrically conductive connection terminal adjacent the first end of the second cooling frame member and forming a portion of the second surface thereof, the base leg of the second electrically conductive connection terminal substantially perpendicular to the first surface of the second cooling frame member; and
a second battery cell abutting at least a portion of the first surface of the second cooling frame member and having a first electrically conductive tab formed of the first material in electrical communication with the first leg of the second electrically conductive connection terminal and a second electrically conductive tab formed of the second material adjacent the second end of the second cooling frame member, the first electrically conductive tab of the second battery cell mechanically and electrically connected to the first leg of the second electrically conductive connection terminal with one of resistance welding, laser welding, chemical welding, ultrasonic welding, brazing and soldering to retain the second battery cell in position relative to the second cooling frame member prior to and during attachment to an adjacent frame member, the second electrically conductive tab of the first battery cell electrically connected to the second leg of the second electrically conductive connection terminal by a compression joint without welding to minimize a difficulty of assembly and disassembly of the battery pack.

2. The repeating frame assembly of claim 1, wherein the second electrically conductive tab of the first battery cell and a surface of the second leg of the second electrically conductive connection terminal are formed of and coated with materials that provide an electrical contact having a resistance of about 30 micro-Ohms when the compression joint is formed therebetween.

3. The repeating frame assembly of claim 2, wherein the second material is a nickel coated copper, and the surface of the second leg of the second electrically conductive connection terminal is one of sulfamate nickel coated aluminum and sulfamate nickel coated aluminum clad material.

4. The repeating frame assembly of claim 2, wherein the first electrically conductive connection terminal includes a first voltage sensing lead in electrical communication therewith, and the second electrically conductive connection terminal includes a second voltage sensing lead in electrical communication therewith.

5. A repeating frame assembly for a battery pack having a plurality of battery cells, the repeating frame assembly comprising:
a first cooling frame member having a first surface, a second surface, a first end, and a second end, at least one of the first surface and the second surface configured to transfer heat to a cooling fluid,
a first electrically conductive connection terminal having a substantially U-shaped cross section when viewed in a direction substantially parallel to the first surface of the first cooling frame member, the first electrically conductive connection terminal including a first leg and a second leg interconnected by a base leg, the first leg adjacent the first end of the first cooling frame member and forming a portion of the first surface thereof, the base leg substantially perpendicular to the first surface; and
a first battery cell abutting at least a portion of the first surface of the first cooling frame member and having a first electrically conductive tab formed of a first material in electrical communication with the first leg of the first electrically conductive connection terminal and a second electrically conductive tab formed of a second material different from the first material adjacent the second end of the first cooling frame member, the first electrically conductive tab of the first battery cell mechanically and electrically connected to the first leg of the first electrically conductive connection terminal with one of resistance welding, laser welding, chemical welding, ultrasonic welding, brazing and soldering to retain the first battery cell in position relative to the first cooling frame member prior to and during attachment to an adjacent frame member;
a first spacer frame member having a first surface, a second surface, a first end and a second end, the second surface of the first spacer frame member abutting at least a portion of the first battery cell, the first end of the first spacer frame member disposed adjacent the second end of the first cooling frame member;
a second electrically conductive connection terminal having a substantially U-shaped cross-section when viewed in a direction substantially parallel to the first surface of the first spacer frame member, the second electrically conductive connection terminal including a first leg and a second leg interconnected by a base leg, the first leg of the second electrically conductive connection terminal adjacent the first end of the first spacer frame member and forming a portion of the first surface thereof, the second leg of the second electrically conductive connection terminal adjacent the first end of the first spacer frame member and forming a portion of the second surface thereof, the base leg of the second electrically conductive connection terminal substantially perpendicular to the first surface of the first spacer frame member; and
a second battery cell abutting at least a portion of the first surface of the first spacer frame member and having a first electrically conductive tab formed of the first material in electrical communication with the first leg of the second electrically conductive connection terminal and a second electrically conductive tab formed of the second material adjacent the second end of the first spacer frame member, the first electrically conductive tab of the second battery cell mechanically and electrically connected to the first leg of the second electrically conductive connection terminal with one of resistance welding, laser welding, chemical welding, ultrasonic welding, brazing and soldering to retain the second battery cell in position relative to the first spacer frame member prior to and during attachment to an adjacent frame member, the second electrically conductive tab of the first battery cell electrically connected to the second leg of the second electrically conductive connection terminal by a compression joint without welding to minimize a difficulty of assembly and disassembly of the battery pack.

6. The repeating frame assembly of claim 5, wherein the second electrically conductive tab of the first battery cell and a surface of the second leg of the second electrically conductive connection terminal are formed of and coated with materials that provide an electrical contact having a resistance of about 30 micro-Ohms when the compression joint is formed therebetween.

7. The repeating frame assembly of claim 6, wherein the second material is a nickel coated copper, and the surface of the second leg of the second electrically conductive connection terminal is one of sulfamate nickel coated aluminum and sulfamate nickel coated aluminum clad material.

8. The repeating frame assembly of claim 5, further comprising:
a second spacer frame member having a first surface, a second surface, a first end and a second end, the second surface of the second spacer frame member abutting at least a portion of the second battery cell, the first end of the second spacer frame member disposed adjacent the second end of the first spacer frame member;
a third electrically conductive connection terminal having a substantially U-shaped cross-section when viewed in a direction substantially parallel to the first surface of the second spacer frame member, the third electrically conductive connection terminal including a first leg and a second leg interconnected by a base leg, the first leg of the third electrically conductive connection terminal adjacent the first end of the second spacer frame member and forming a portion of the first surface thereof, the second leg of the third electrically conductive connection terminal adjacent the first end of the second spacer frame member and forming a portion of the second surface thereof, the base leg of the third electrically conductive connection terminal substantially perpendicular to the first surface of the second spacer frame member; and a third battery cell abutting at least a portion of the first surface of the second spacer frame member and having a first electrically conductive tab formed of the first material in electrical communication with the first leg of the third electrically conductive connection terminal and a second electrically conductive tab formed of the second material adjacent the second end of the second spacer frame member, the first electrically conductive tab of the third battery cell mechanically and electrically connected to the first leg of the third electrically conductive connection terminal with one of resistance welding, laser welding, chemical welding, ultrasonic welding, brazing and soldering to retain the third battery cell in position relative to the second spacer frame member prior to and during attachment to an adjacent frame member, the second electrically conductive tab of the second battery cell electrically connected to the second leg of the third electrically conductive connection terminal by a compression joint without welding to minimize a difficulty of assembly and disassembly of the battery pack.

9. The repeating frame assembly of claim 8, wherein the second electrically conductive tab of the first battery cell and a surface of the second leg of the second electrically conductive connection terminal are formed of and coated with materials that provide an electrical contact having a resistance of about 30 micro-Ohms when the compression joint is formed therebetween, and the second electrically conductive tab of the second battery cell and a surface of the second leg of the third electrically conductive connection terminal are formed of and coated with materials that provide an electrical contact having a resistance of about 30 micro-Ohms when the compression joint is formed therebetween.

10. The repeating frame assembly of claim 9, wherein the second material is a nickel coated copper, and the surface of the second leg of the second electrically conductive connection terminal and the surface of the second leg of the third electrically conductive connection terminal are one of sulfamate nickel coated aluminum and sulfamate nickel coated aluminum clad material.

11. A repeating frame assembly for a battery pack having a plurality of battery cells, the repeating frame assembly comprising:

a first cooling frame member having a first surface, a second surface, a first end, and a second end, at least one of the first surface and the second surface configured to transfer heat to a cooling fluid, a first electrically conductive connection terminal having a substantially U-shaped cross section when viewed in a direction substantially parallel to the first surface of the first cooling frame member, the first electrically conductive connection terminal including a first leg and a second leg interconnected by a base leg, the first leg adjacent the first end of the first cooling frame member, the second leg adjacent the first end of the first cooling frame member, the first leg forming at least a portion of the first surface of the first cooling frame member and the second leg forming at least a portion of the second surface of the first cooling frame member, the base leg of the first electrically conductive connection terminal substantially perpendicular to the first surface and the second surface of the first cooling frame member; and a first battery cell abutting at least a portion of the first surface of the first cooling frame member and having a first electrically conductive tab formed of a first material in electrical communication with the first leg of the first electrically conductive connection terminal and a second electrically conductive tab formed of a second material different from the first material adjacent the second end of the first cooling frame member, the first electrically conductive tab of the first battery cell mechanically and electrically connected to the first leg of the first electrically conductive connection terminal with one of resistance welding, laser welding, chemical welding, ultrasonic welding, brazing and soldering to retain the first battery cell in position relative to the first cooling frame member prior to and during attachment to an adjacent frame member;

a second cooling frame member having a first surface and a second surface and a first end and a second end, at least one of the first surface and the second surface adapted to transfer heat to a cooling fluid, the second surface abutting at least a portion of the first battery cell, the first end of the second cooling frame member disposed adjacent the second end of the first cooling frame member;

a second electrically conductive connection terminal having a substantially U-shaped cross-section when viewed in a direction substantially parallel to the first surface of the second cooling frame member, the second electrically conductive connection terminal including a first leg and a second leg interconnected by a base leg, the first leg of the second electrically conductive connection terminal adjacent the first end of the second cooling frame member, the second leg of the second electrically conductive connection terminal adjacent the first end of the second cooling frame member, the first leg of the second electrically conductive connection terminal forming at least a portion of the first surface of the second cooling frame member and the second leg of the second electrically conductive connection terminal forming at least a portion of the second surface of the second cooling frame member, the base leg of the second electrically conductive connection terminal substantially perpendicular to the first surface and the second surface of the second cooling frame member; and a second battery cell abutting at least a portion of the first surface of the second cooling frame member and having a first electrically conductive tab formed of the first material in electrical communication with the first leg of the second electrically conductive connection terminal and a second electrically conductive tab formed of the second material adjacent the second end of the second cooling frame member, the first electrically conductive tab of the second battery cell mechanically and electrically connected to the first leg of the second electrically conductive connection terminal with one of resistance welding, laser welding, chemical welding, ultrasonic welding, brazing and soldering to retain the second battery cell in position relative to the second cooling frame member prior to and during attachment to an adjacent frame member, the second electrically conductive tab of the first battery cell electrically connected to the second leg of the second electrically conductive connection terminal by a compression joint without welding to minimize a difficulty of assembly and disassembly of the battery pack.

12. The repeating frame assembly of claim 11, wherein the second electrically conductive tab of the first battery cell and a surface of the second leg of the second electrically conductive connection terminal are formed of and coated with materials that provide an electrical contact having a resistance of about 30 micro-Ohms when the compression joint is formed therebetween.

13. A repeating frame assembly for a battery pack having a plurality of battery cells, the repeating frame assembly comprising:

a first cooling frame member having a first surface, a second surface, a first end, and a second end, at least one of the first surface and the second surface configured to transfer heat to a cooling fluid, a first electrically conductive connection terminal having a substantially U-shaped cross section when viewed in a direction substantially parallel to the first surface of the first cooling frame member, the first electrically conductive connection terminal including a first leg and a second leg interconnected by a base leg, the first leg adjacent the first end of the first cooling frame member, the second leg adjacent the first end of the first cooling frame member, the first leg forming at least a portion of the first surface of the first cooling frame member and the second leg forming at least a portion of the second surface of the first cooling frame member, the base leg of the first electrically conductive connection terminal substantially perpendicular to the first surface and the second surface of the first cooling frame member; and a first battery cell abutting at least a portion of the first surface of the first cooling frame member and having a first electrically conductive tab formed of a first material in electrical communication with the first leg of the first electrically conductive connection terminal and a second electrically conductive tab formed of a second material different from the first material adjacent the second end of the first cooling frame member, the first electrically conductive tab of the first battery cell mechanically and electrically connected to the first leg of the first electrically conductive connection terminal with one of resistance welding, laser welding, chemical welding, ultrasonic welding, brazing and soldering to retain the first battery cell in position relative to the first cooling frame member prior to and during attachment to an adjacent frame member;

a first spacer frame member having a first surface, a second surface, a first end, and a second end, the second surface of the first spacer frame member abutting at least a portion of the first battery cell, the first end of the first spacer frame member disposed adjacent the second end of the first cooling frame member;

a second electrically conductive connection terminal having a substantially U-shaped cross-section when viewed in a direction substantially parallel to the first surface of the first spacer frame member, the second electrically conductive connection terminal including a first leg and a second leg interconnected by a base leg, the first leg of the second electrically conductive connection terminal adjacent the first end of the first spacer frame member, the second leg of the second electrically conductive connection terminal adjacent the first end of the first spacer frame member, the first leg of the second electrically conductive connection terminal forming at least a portion of the first surface of the first spacer frame member and the second leg of the second electrically conductive connection terminal forming at least a portion of the second surface of the first spacer frame member, the base leg of the second electrically conductive connection terminal substantially perpendicular to the first surface and the second surface of the first spacer frame member; and a second battery cell abutting at least a portion of the first surface of the first spacer frame member and having a first electrically conductive tab formed of the first material in electrical communication with the first leg of the second electrically conductive connection terminal and a second electrically conductive tab formed of the second material adjacent the second end of the first spacer frame member, the first electrically conductive tab of the second battery cell mechanically and electrically connected to the first leg of the second electrically conductive connection terminal with one of resistance welding, laser welding, chemical welding, ultrasonic welding, brazing and soldering to retain the second battery cell in position relative to the first spacer frame member prior to and during attachment to an adjacent frame member, the second electrically conductive tab of the first battery cell electrically connected to the second leg of the second electrically conductive connection terminal by a compression joint without welding to minimize a difficulty of assembly and disassembly of the battery pack.

14. The repeating frame assembly of claim 13, further comprising:

a second spacer frame member having a first surface, a second surface, a first end, and a second end, the second surface of the second spacer frame member abutting at least a portion of the second battery cell, the first end of the second spacer frame member disposed adjacent the second end of the first spacer frame member;

a third electrically conductive connection terminal having a substantially U-shaped cross-section when viewed in a direction substantially parallel to the first surface of the second spacer frame member, the third electrically conductive connection terminal including a first leg and a second leg interconnected by a base leg, the first leg of the third electrically conductive connection terminal molded within the first end of the second spacer frame member, the second leg of the third electrically conductive connection terminal molded within the first end of the second spacer frame member, the first leg of the third electrically conductive connection terminal forming at least a portion of the first surface of the second spacer frame member and the second leg of the third electrically conductive connection terminal forming at least a portion of the second surface of the second spacer frame member, the base leg of the third electrically conductive connection terminal substantially perpendicular to the first surface and the second surface of the second spacer frame member, a voltage sensing lead in electrical communication with the third electrically conductive connection terminal; and a third battery cell abutting at least a portion of the first surface of the second spacer frame member and having a first electrically conductive tab formed of the first material in electrical communication with the first leg of the third electrically conductive connection terminal and a second electrically conductive tab formed of the second material adjacent the second end of the second spacer frame member, the first electrically conductive tab of the third battery cell mechanically and electrically connected to the first leg of the third electrically conductive connection terminal with one of resistance welding, laser welding, chemical welding, ultrasonic welding, brazing and soldering to retain the third battery cell in position relative to the second spacer frame member prior to and during attachment to an adjacent frame member, the second electrically conductive tab of the second battery cell electrically connected to the second leg of the third electrically conductive connection terminal by a compression joint without welding to minimize a difficulty of assembly and disassembly of the battery pack.

15. The repeating frame assembly of claim 14, wherein the second electrically conductive tab of the first battery cell and a surface of the second leg of the second electrically conductive connection terminal are formed of and coated with materials that provide an electrical contact having a resistance of about 30 micro-Ohms when the compression joint is formed therebetween, and the second electrically conductive tab of the second battery cell and a second surface of the bottom leg of the third electrically conductive connection terminal are formed of and coated with materials that provides an electrical contact having a resistance of about 30 micro-Ohms when the compression joint is formed therebetween.

16. A repeating frame assembly for a battery pack having a plurality of battery cells, the repeating frame assembly comprising:
   a first cooling frame member having a first surface, a second surface, a first end, and a second end, at least one of the first surface and the second surface configured to transfer heat to a cooling fluid,
   a first electrically conductive connection terminal having a substantially U-shaped cross section when viewed in a direction substantially parallel to the first surface of the first cooling frame member, the first electrically conductive connection terminal including a first leg and a second leg interconnected by a base leg, the first leg molded within the first end of the first cooling frame member, the second leg molded within the first end of the first cooling frame member, the first leg forming at least a portion of the first surface of the first cooling frame member and the second leg forming at least a portion of the second surface of the first cooling frame member, the base leg of the first electrically conductive connection terminal substantially perpendicular to the first surface and the second surface of the first cooling frame member, a first voltage sensing lead in electrical communication therewith; and
   a first battery cell abutting at least a portion of the first surface of the first cooling frame member and having a first electrically conductive tab formed of a first material in electrical communication with the first leg of the first electrically conductive connection terminal and a second electrically conductive tab formed of a second material different from the first material adjacent the second end of the first cooling frame member, the first electrically conductive tab of the first battery cell mechanically and electrically connected to the first leg of the first electrically conductive connection terminal with one of resistance welding, laser welding, chemical welding, ultrasonic welding, brazing and soldering to retain the first battery cell in position relative to the first cooling frame member prior to and during attachment to an adjacent frame member;
   a second cooling frame member having a first surface and a second surface and a first end and a second end, at least one of the first surface and the second surface adapted to transfer heat to a cooling fluid, the second surface abutting at least a portion of the first battery cell, the first end of the second cooling frame member disposed adjacent the second end of the first cooling frame member;
   a second electrically conductive connection terminal having a substantially U-shaped cross-section when viewed in a direction substantially parallel to the first surface of the second cooling frame member, the second electrically conductive connection terminal including a first leg and a second leg interconnected by a base leg, the first leg of the second electrically conductive connection terminal molded within the first end of the second cooling frame member, the second leg of the second electrically conductive connection terminal molded within the first end of the second cooling frame member, the first leg of the second electrically conductive connection terminal forming at least a portion of the first surface of the second cooling frame member and the second leg of the second electrically conductive connection terminal forming at least a portion of the second surface of the second cooling frame member, the base leg of the second electrically conductive connection terminal substantially perpendicular to the first surface and the second surface of the second cooling frame member, a second voltage sensing lead in electrical communication therewith; and
   a second battery cell abutting at least a portion of the first surface of the second cooling frame member and having a first electrically conductive tab formed of the first material in electrical communication with the first leg of the second electrically conductive connection terminal and a second electrically conductive tab formed of the second material adjacent the second end of the second cooling frame member, the first electrically conductive tab of the second battery cell mechanically and electrically connected to the first leg of the second electrically conductive connection terminal with one of resistance welding, laser welding, chemical welding, ultrasonic welding, brazing and soldering to retain the second battery cell in position relative to the second cooling frame member prior to and during attachment to an adjacent frame member, the second electrically conductive tab of the first battery cell electrically connected to the second leg of the second electrically conductive connection terminal by a compression joint without welding to minimize a difficulty of assembly and disassembly of the battery pack.

17. A repeating frame assembly for a battery pack having a plurality of battery cells, the repeating frame assembly comprising:
   a first cooling frame member having a first surface, a second surface, a first end, and a second end, at least one of the first surface and the second surface configured to transfer heat to a cooling fluid,
   a first electrically conductive connection terminal having a substantially U-shaped cross section when viewed in a direction substantially parallel to the first surface of the first cooling frame member, the first electrically conductive connection terminal including a first leg and a second leg interconnected by a base leg, the first leg molded within the first end of the first cooling frame member, the second leg molded within the first end of the first cooling frame member, the first leg forming at least a portion of the first surface of the first cooling frame member and the second leg forming at least a portion of the second surface of the first cooling frame member, the base leg of the first electrically conductive connection terminal substantially perpendicular to the first surface and the second surface of the first cooling frame member, a first voltage sensing lead in electrical communication therewith; and
   a first battery cell abutting at least a portion of the first surface of the first cooling frame member and having a first electrically conductive tab formed of a first material in electrical communication with the first leg of the first electrically conductive connection terminal and a second electrically conductive tab formed of a second material different from the first material adjacent the second end of the first cooling frame member, the first electrically conductive tab of the first battery cell mechanically and electrically connected to the first leg of the first electrically conductive connection terminal with one of resistance welding, laser welding, chemical welding, ultrasonic welding, brazing and soldering to retain the first battery cell in position relative to the first cooling frame member prior to and during attachment to an adjacent frame member;

a first spacer frame member having a first surface, a second surface, a first end, and a second end, the second surface of the first spacer frame member abutting at least a portion of the first battery cell, the first end of the first spacer frame member disposed adjacent the second end of the first cooling frame member;

a second electrically conductive connection terminal having a substantially U-shaped cross-section when viewed in a direction substantially parallel to the first surface of the first spacer frame member, the second electrically conductive connection terminal including a first leg and a second leg interconnected by a base leg, the first leg of the second electrically conductive connection terminal molded within the first end of the first spacer frame member, the second leg of the second electrically conductive connection terminal molded within the first end of the first spacer frame member, the first leg of the second electrically conductive connection terminal forming at least a portion of the first surface of the first spacer frame member and the second leg of the second electrically conductive connection terminal forming at least a portion of the second surface of the first spacer frame member, the base leg of the second electrically conductive connection terminal substantially perpendicular to the first surface and the second surface of the first spacer frame member, a second voltage sensing lead in electrical communication therewith; and a second battery cell abutting at least a portion of the first surface of the first spacer frame member and having a first electrically conductive tab formed of the first material in electrical communication with the first leg of the second electrically conductive connection terminal and a second electrically conductive tab formed of the second material adjacent the second end of the first spacer frame member, the first electrically conductive tab of the second battery cell mechanically and electrically connected to the first leg of the second electrically conductive connection terminal with one of resistance welding, laser welding, chemical welding, ultrasonic welding, brazing and soldering to retain the second battery cell in position relative to the first spacer frame member prior to and during attachment to an adjacent frame member, the second electrically conductive tab of the first battery cell electrically connected to the second leg of the second electrically conductive connection terminal by a compression joint without welding to minimize a difficulty of assembly and disassembly of the battery pack.

* * * * *